Nov. 24, 1964  J. O. DICKERSON  3,158,302
UTILITY CARRIER
Filed Aug. 9, 1961
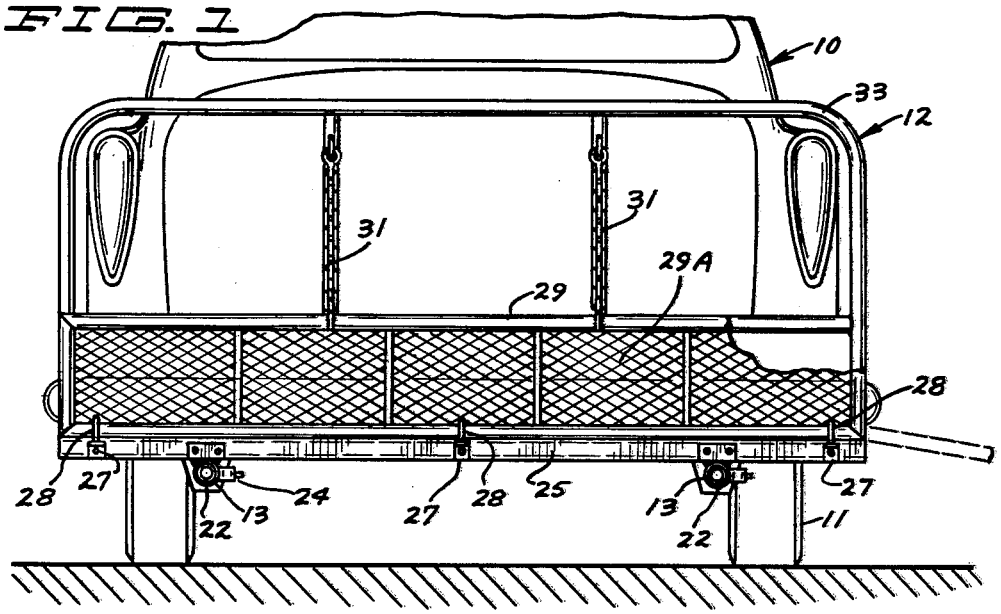
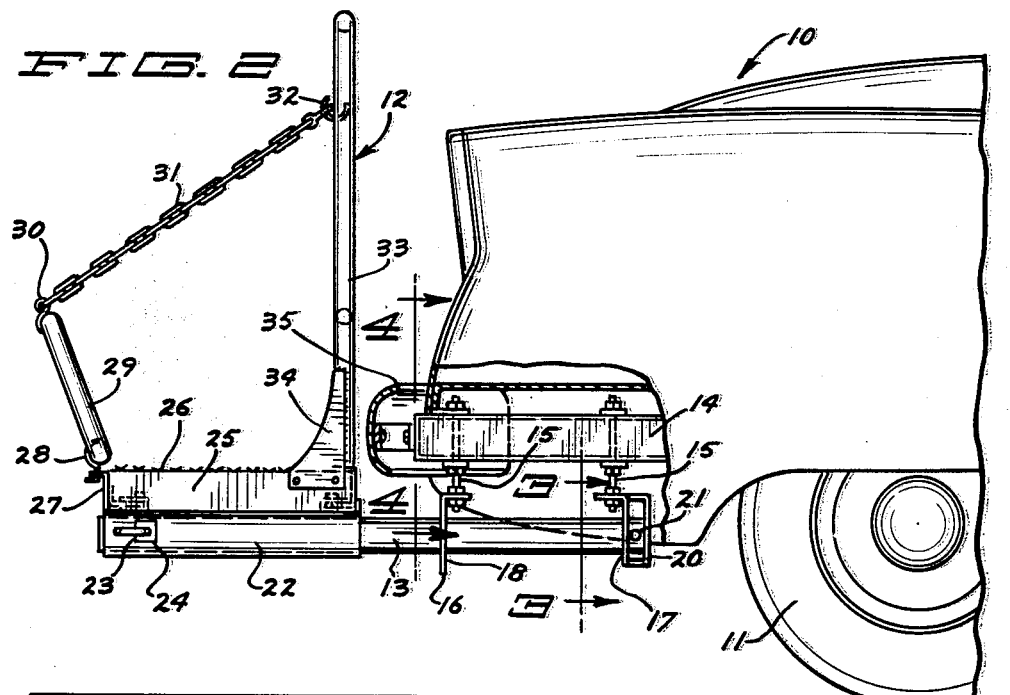
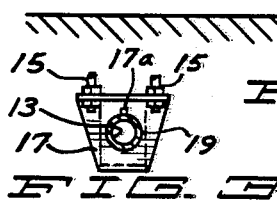
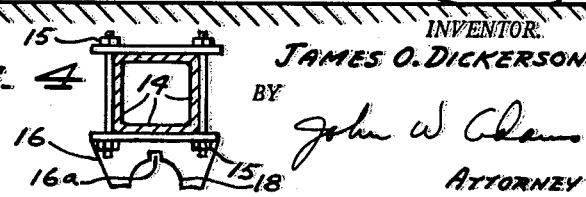
INVENTOR.
JAMES O. DICKERSON
BY
John W. Adams
ATTORNEY

United States Patent Office 3,158,302
Patented Nov. 24, 1964

3,158,302
UTILITY CARRIER
James O. Dickerson, Butte, Mont., assignor to Handy Hauler, Inc., Butte, Mont., a corporation of Montana
Filed Aug. 9, 1961, Ser. No. 130,286
1 Claim. (Cl. 224—42.43)

This invention relates to a luggage carrier and more particularly to a luggage carrier mounted on the rear portion of an automobile.

My luggage carrier is primarily suited for mounting on the rear portion of a vehicle, and in the preferred embodiment is attached to the frame of an automobile in a manner to permit the same to be readily detached therefrom.

It is therefore an object of my invention to provide a luggage carrier readily attachable to and detachable from a vehicle.

It is a further object of my invention to provide a luggage carrying means for a vehicle of light weight construction wherein said construction includes a portion that is separable therefrom for use as a loading ramp if desired.

These and other objects and advantages of this invention will more fully appear from the following description made in connection with the accompanying drawings, wherein like reference characters refer to the same or similar parts throughout the views, and in which:

FIG. 1 is an elevation of my luggage carrier mounted on the rear of an automobile;

FIG. 2 is a side elevation of my luggage carrier as attached to an automobile;

FIG. 3 is a clamp detail taken at 3—3 of FIG. 2; and

FIG. 4 is another detail of a clamp taken at 4—4 of FIG. 2, with the lower portion of the bracket broken away.

Referring now to FIG. 1, a vehicle 10 having wheels 11 is shown with a luggage carrier 12 mounted at the rear of said vehicle.

Supporting members 13 are attached to vehicle frame 14 by bolts 15 and supporting angles 16 and 17. Supporting angle 16 is provided with an opening 18 through which member 13 passes and rests. Supporting angle 17 is provided with an opening 19 and a stop means 20 wherein supporting member 13 is supported and secured by angle 17 and retaining pin 21.

Each of the depending flanges of the angles 16 and 17 has a pin-receiving slot respectively designated by the numerals 16a and 17a as illustrated in FIGS. 3 and 4. The tubular supporting members 13 are initially rotated so that the pin 21 is aligned with the slots 16a and 17a and passes therethrough and is subsequently rotated within the apertures 18 and 19 so that the pin 21 will engage the rear side of the depending flange of angle 17, as best shown in FIG. 2. The forward end of the supporting member 13 will abut the stop 20 so that the supporting members 13 will be securely locked in place.

The luggage carrier 12 is mounted on a pair of carrier base tubes 22 which are fixed thereto and which have an inside diameter slightly greater than the outside diameter of the supporting members 13, and are disposed in axial alignment with said supporting member 13 when the same are mounted on the frame of the car as described. When the carrier is mounted on the supporting members, a pair of apertures 23 respectively provided in tubes 22 and the adjacent supporting member 13 received therewithin will be in alignment to receive a spring latch type pin 24 therethrough. The spring latch 24 serves two functions, one being to prevent relative longitudinal movement between the tubes 22 and the supporting members 13, and the other being to prevent rotational movement of the tubes 13 in order to maintain the pin 21 in locked position out of registration with the access slot 17a.

Secured to the top portion of tubes 22, as by welding, is rectangular luggage carrier frame 25 which forms the support for base 26 of the luggage carrier 12. In the preferred embodiment, the base 26 is wire-mesh and welded to said carrier frame 25.

Said carrier frame 25 is also provided with hinge clamp members 27 to receive hinge clamps 28 of hinged carrier side 29. Hinge clamp 28 may be removed from association with clamp member 27 to entirely remove said side 29 from the carrier 12.

At the upper portion of side 29 are chain securing clamps 30 for securing chains 31 at one end thereof. The other end of said chains 31 are removably attached to clamps 32 mounted on carrier rear frame member 33. The length of chains 31 determines the positioning of side 29 in relation to the carrier 12.

The rear frame member 33 is secured to frame 25 by welded angles 34 bolted to said frame 25. The rear frame member 33 is thus supported in a substantially vertical position in relation to frame 25, and may be removed therefrom by unbolting angles 34 from frame 25.

It can be seen that tubes 22 are located on supporting members 13 to be spaced from bumper 35 of vehicle 10, and that the carrier 12 can be readily removed from members 13 by releasing spring latches 24 from slots 23.

Luggage carrier 12 is substantially the same width as vehicle 10 and thus presents no problem while the vehicle is being driven.

Thus I have disclosed my novel luggage carrier means which is easily and simply installed onto the frame of a vehicle. The side 29 is removable as hereinabove described and can be used as a loading ramp as shown by dotted line in FIG. 1.

It will, of course, be understood that various changes may be made in the form, details, arrangements and proportion of parts without departing from the scope of my invention, which generally stated consists in the matter set forth in the appended claim.

I claim:

A readily removable luggage carrier for automobiles comprising a plurality of longitudinally extending spaced apart supporting members, a plurality of pairs of longitudinally spaced apart mounting brackets secured to the frame of an automobile and having axially aligned openings therethrough to respectively receive the supporting members when in one rotative position but positively locking the same against longitudinal movement when in another rotative position, a carrier mounted on said supporting members, releasable latching means for positively locking said supporting members against rotation when in mounted position, each of said supporting members having a radially outwardly extending pin fixed thereto, and each of said aligned brackets having an access slot formed therein of a size to receive said locking pin when the same is in registration therewith to permit the same to be inserted or withdrawn therethrough when in one rotative position with said brackets positively locking said supporting members when said pin is rotated out of registered alignment with said access opening.

References Cited in the file of this patent

UNITED STATES PATENTS

| 1,412,192 | Moore | Apr. 11, 1922 |
| 1,625,808 | Hyde | Apr. 26, 1927 |
| 2,502,781 | Erickson | Apr. 4, 1950 |